Feb. 11, 1958
F. W. HARRIS
2,822,748
WIRE TYING BALERS
Filed Jan. 12, 1952
3 Sheets-Sheet 1
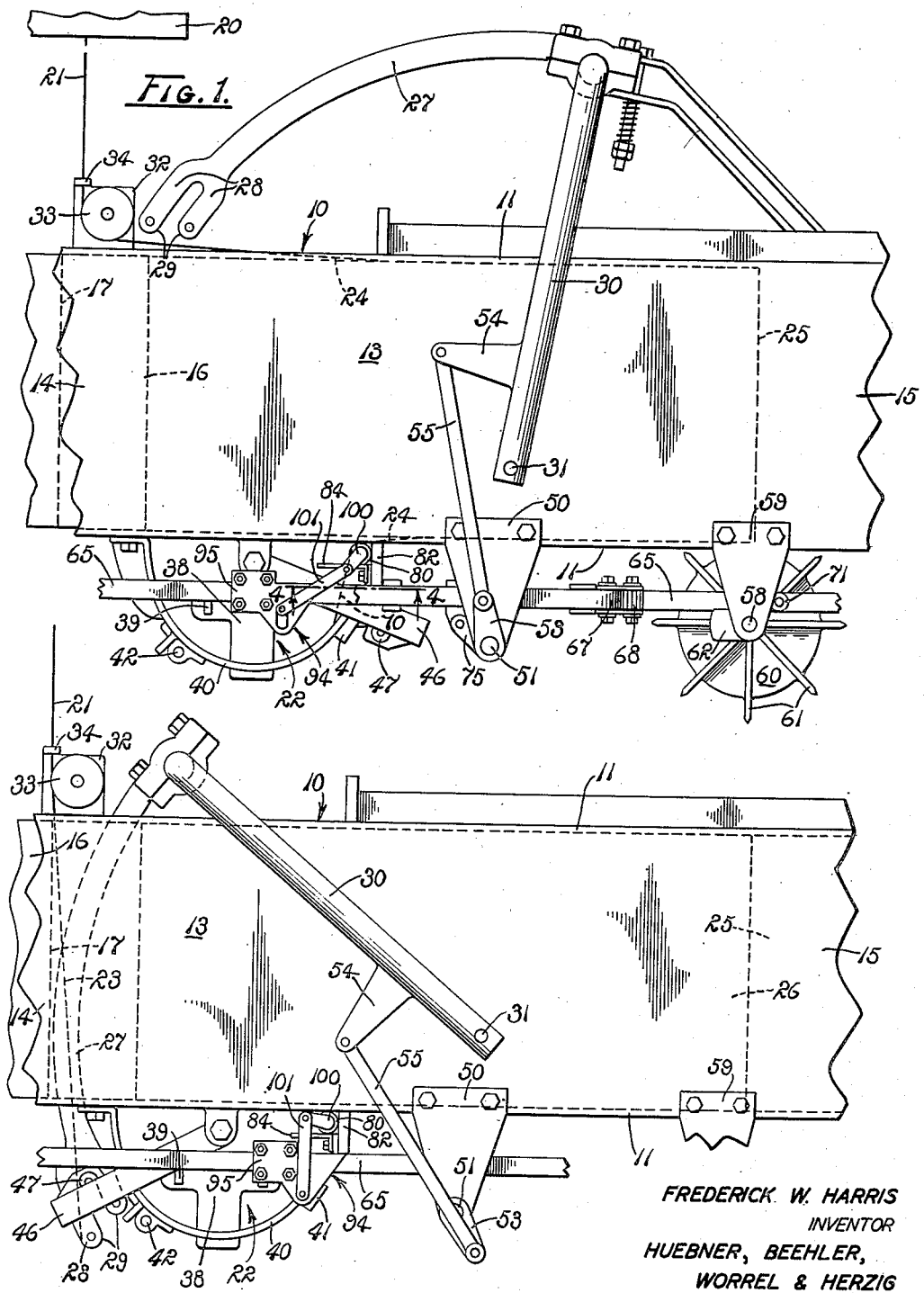
FREDERICK W. HARRIS
INVENTOR
HUEBNER, BEEHLER,
WORREL & HERZIG
ATTORNEYS Feb. 11, 1958  F. W. HARRIS  2,822,748
WIRE TYING BALERS
Filed Jan. 12, 1952  3 Sheets-Sheet 2
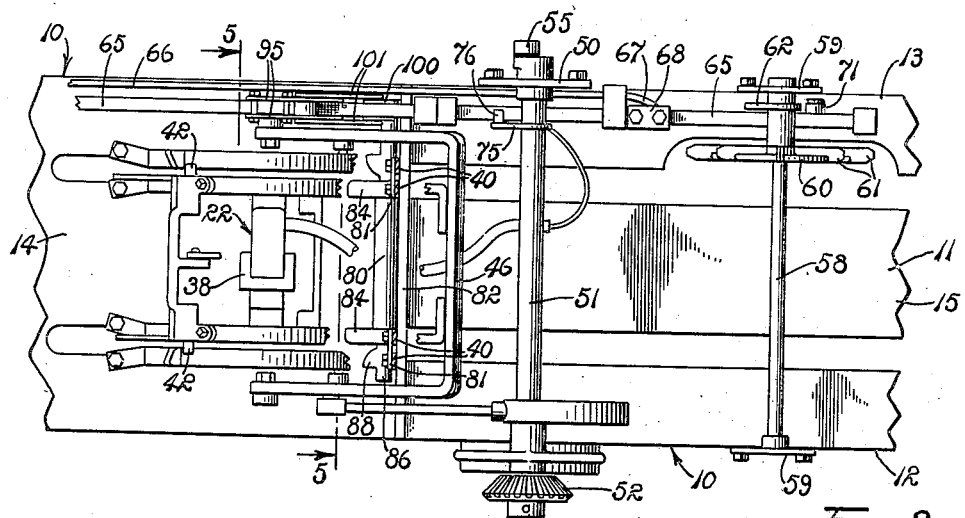
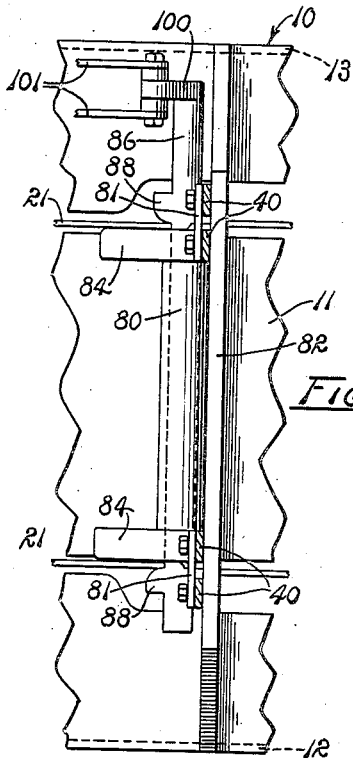 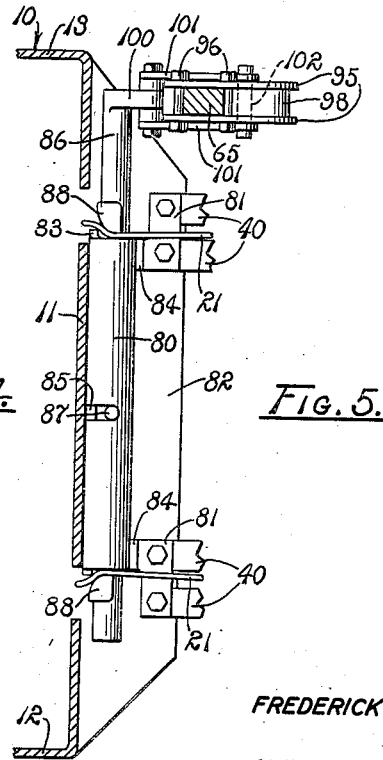
FREDERICK W. HARRIS
INVENTOR
HUEBNER, BEEHLER,
WORREL & HERZIG
ATTORNEYS Feb. 11, 1958   F. W. HARRIS   2,822,748
WIRE TYING BALERS
Filed Jan. 12, 1952   3 Sheets-Sheet 3

FREDERICK W. HARRIS
INVENTOR
HUEBNER, BEEHLER,
WORREL & HERZIG
ATTORNEYS
BY

United States Patent Office 2,822,748
Patented Feb. 11, 1958

2,822,748

WIRE TYING BALERS

Frederick W. Harris, Tulare, Calif., assignor to Sperry Rand Corporation, New Holland, Pa., a corporation of Delaware Application January 12, 1952, Serial No. 266,163

10 Claims. (Cl. 100—23)

The present invention relates to wire-tying balers and particularly to a holding apparatus for wire, ropes and other flexible tension members.

The problems which motivated the present invention's reduction to practice arose in connection with the operation of wire-tying balers and the invention is defined in connection with such apparatus for descriptive convenience. It is to be borne in mind, however, that the holding apparatus utilized in the baler subsequently described has utility in other operational environments where it is desired successively to hold and to release wires, ropes and other flexible tension members.

Although vast strides have been made in the development of automatic wire-tying balers for hay, they are subject to certain disadvantages which the present invention has overcome. During certain cycles of their operation, such balers usually rely on the compression of hay against the walls of a bale chamber to hold tying wires temporarily in place. Variation in hay quality and moisture content as well as compression precludes entirely dependable holding action by such structures. In certain well-known balers, wire slippage causes such extensive entanglement of the apparatus as to preclude economical baling and tying operations and subjects the complex mechanisms utilized therein to serious damage. In substantially all conventional balers, the improper holding of tying wire frequently ruins bales during compression thereof, and if not immediately observed and the condition corrected by an operator, a succession of bales may be ruined.

It is well known that automatic baling operations must be conducted when the material to be baled is of precisely the proper condition. In many climates, the proper conditions exist for only a very brief period. Thus, the entanglement and structural failures of automatic balers are of even greater consequence because of the dependence on the bales at the precise periods of desired operation.

An object of the present invention is to obviate the slipping of tying wire and the like in automatic balers.

Another object is to obviate the improper operation, structural failures and periods of inoperability caused by repair and adjustment requirements incident to the improper holding of tying wires in balers.

Another object is to provide a dependable holding apparatus for wires, ropes and the like adapted for use in hay balers synchronously to hold and release such flexible tension members with baler operation.

Another object is to provide a holding apparatus for a flexible tension member incorporating cooperative guide means and clamping formations.

Further objects and advantages will become apparent in the subsequent description in the specification.

In the drawings:

Fig. 1 is a fragmentary plan view of a bale chamber and associated mechanism in a well known commercial form of automatic baling apparatus embodying the inventions of United States Patents Nos. 2,236,628, 2,355,644, 2,355,647, and 2,528,538 showing a holding apparatus of the present invention mounted therein. The elements of the mechanism shown in Fig. 1 are illustrated in the relationship assumed at the start of a baling operation.

Fig. 2 is a plan view somewhat similar to Fig. 1 but showing certain operable elements thereof in a successive operating position. The elements are illustrated in a position assumed during the tying of a bale formed in the baler.

Fig. 3 is a side elevation of the structure shown in Fig. 1.

Fig. 4 is an enlarged fragmentary side elevation taken on line 4—4 of Fig. 1 illustrating a holding apparatus embodying the principles of the present invention.

Fig. 5 is a vertical section taken on line 5—5 of Fig. 3 showing an elevation of the holding apparatus in substantially right angular relation to the elevation of Fig. 4.

Figure 6:
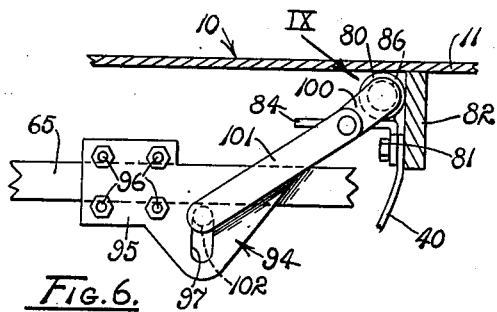
Figure 7:
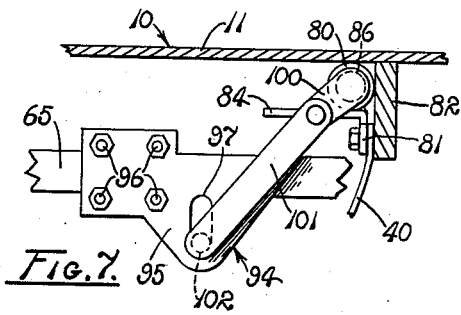
Figure 8:
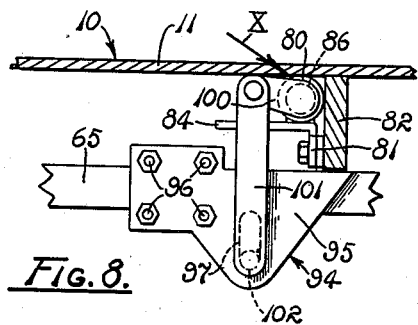

Figs. 6, 7, and 8 are a succession of plan views of the holding apparatus of the present invention illustrated in association with fragmentarily represented portions of a conventional baling mechanism.

Figure 9:
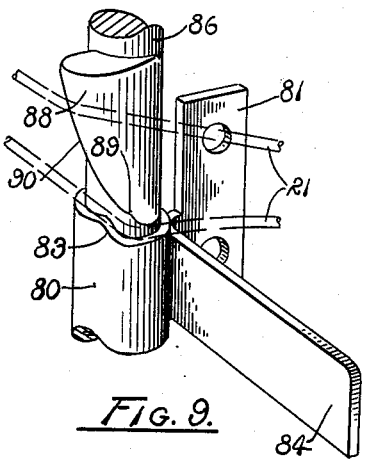

Fig. 9 is a fragmentary perspective of a guiding cam and clamping structure of the holding apparatus as viewed in the direction of the arrow IX in Fig. 6.

Figure 10:
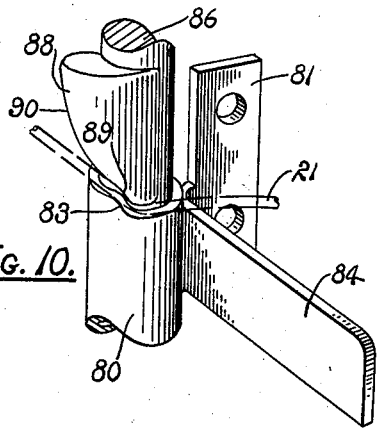

Fig. 10 is a view similar to Fig. 9 showing the clamping structure in wire holding position as viewed in the direction of the arrow X in Fig. 8.

Figure 11:
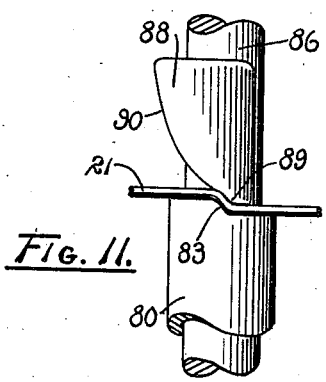

Fig. 11 is an elevation of the clamping structure as shown in Fig. 10.

Referring in greater detail to the drawings:

An elongated bale chamber is indicated generally at 10 consisting of a pair of substantially parallel side walls 11, a floor 12 and a cover 13. The chamber has a hay admitting forward end 14 and a bale discharging rearward end 15. It is the usual practice for a bale of hay to be held adjacent to the discharge end 15 of the bale chamber by adjustable compression means, not shown, to act as a stop against which successive charges of hay or the like are rammed to form a successive bale which subsequently moves rearwardly in the bale chamber thrusting the preceding bale from the baling apparatus and assuming the position previously occupied by the preceding bale for the purposes of ramming a following bale thereagainst. A plunger 16 is reciprocally driven longitudinally of the bale chamber to compact successive charges of hay therein. The plunger has a pair of needle passages 17 formed substantially horizontally across the end thereof.

The motivation of the plunger 16 is effected in any convenient way, not shown. The entire baler, only a fragment of which is illustrated in the drawings, is mounted for earth traversing movement and is usually guided longitudinally of a previously formed windrow of hay and serves to pick up the hay, form bales thereof, and to discharge the bales in the field for subsequent collection.

Conventional balers usually mount a pair of wire reels 20 by any suitable means adjacent to a side of the bale chamber 10. A pair of wires or other bale confining strands 21 are unwound from the reels during operation and are utilized for tying bales formed in the chamber 10. A wire tying mechanism indicated generally at 22 is provided at the side of the bale chamber opposite to the reels. Preliminary to baling operations, the wires are threaded through the admitting end 14 of the bale chamber 10 and the ends thereof secured in the tying mechanism as subsequently described.

The positions of the wires preliminary to baling are illustrated at 23. As hay or the like is rammed rearwardly in the bale chamber, the wires are thrust rearwardly in the chamber into the positions shown at 24 against a previously formed bale 25. When the compression of hay into a new bale 26 is completed, motivation of the plunger 16 is interrupted and a pair of needles 27 are reciprocated transversely of the admitting end 14 of the bale chamber 10 to thread the wires 21 across the forward end of the new bale. The needles 27 are conventionally of the arcuate form shown, having bifurcated forward ends 28 mounting a pair of spaced rollers 29 for wire engagement. The needles are borne on a needle yoke 30 mounted for pivotal movement about a substantially erect axis 31 on the bale chamber 10.

A guide bracket 32 having a guide roller 33 is mounted forwardly adjacent to each of the needles on the bale chamber 10. A rest pad 34 is extended from each of the brackets and engages the wires 21 between the rollers 33 and the reels 20.

Referring to the tying mechanism 22 in greater particularity, a pair of twisters 38, as typified in the U. S. patent to Nolt, No. 2,528,538, for example, are mounted at the side of the bale chamber opposite to the needles individually at substantially the same elevation as each needle for reciprocal movement between inoperable position, shown in Fig. 1, and operable position shown in Fig. 2. A vertically reciprocal shear or cutter 39 also typified by the Nolt Patent No. 2,528,538, for example, is mounted rearwardly adjacent to each twister. A slotted twister guard 40 of substantially semicircular form is rigidly mounted on the bale chamber in enclosing relation to each of the twisters and cutters. A wire retainer 41 is mounted on each of the guards rearwardly adjacent to its respective twister and cutter. The retainer is of the ball type adapted to clamp wire drawn rearwardly therein and to release wire drawn forwardly therefrom. A wire separator plunger 42 is mounted for vertical reciprocal movement on each of the guides forwardly adjacent to each of the twisters for purposes soon to be described.

A gripper yoke 46 is pivotally mounted on the bale chamber inwardly of the twister for pivotal movement between a rearwardly extended position, shown in Fig. 1, and a forwardly extended position, shown in Fig. 2. A pair of wire pick-up rollers 47 are rotatably mounted on the gripper yoke individually in alignment with the slot of each of the guards and to pass between the needle rollers 29 when the needles are extended through the bale chamber 10, also as shown in Fig. 2.

A pair of brackets 50 are conventionally mounted rearwardly adjacent to the guards 40 and the retainers 41 and are extended from the bale chamber 10. A needle yoke driven shaft 51 is rotatably mounted in the bracket in a substantially vertical position. The shaft is driven in a counterclockwise direction, as viewed in Figs. 1 and 2 through a driving mechanism, not shown in detail, including the driven gear 52 shown in Fig. 3. A crank arm 53 is radially extended from the driven shaft 51 above the chamber 10. A lever arm 54 is transversely extended from the needle yoke 30 above the chamber and is coupled to the radially extended end of the crank arm 53 by a drag link 55. It is sufficient at this point to observe that the driven shaft 51 remains stationary with the needles 27 retracted during operation of the plunger 16 to form a bale. When the bale is completed, the plunger is automatically stopped in retracted position, and the driven shaft rotated to extend the needles through the passages 17 of the plungers and bale chamber to direct wire to the pickup rollers 47.

Rearwardly adjacent to the driven shaft 51, a metering shaft 58 is journaled in a pair of brackets 59 mounted on the bale chamber 10 and a metering wheel 60 provided thereon having radially extended teeth 61. The teeth are extended successively into the bale chamber upon metering shaft rotation. A pawl 62 is radially extended from the metering shaft 58. The actuation of the plunger 16 and of the tying mechanism 22 is effected by a mechanism, not shown, which includes a well-known over-center mechanism. For the purposes of the present invention, it is sufficient to observe that the over-center mechanism is controlled by means of a trip rod 65, evident in Fig. 3, mounted for longitudinal movement adjacent to the bale chamber 10. When the trip rod is moved rearwardly to a predetermined position, the over-center mechanism stops the plunger 16 and starts the motivation of the needles 27 and tying mechanism 22 and when the trip rod has moved forwardly to a predetermined position it causes the over-center mechanism to stop the needles in retracted position, as shown in Fig. 1, to interrupt operation of the tying mechanism, and to reactivate the plunger. A push rod 66 is slidably mounted for longitudinal movement longitudinally of the trip rod in elevated parallel relation adjacent thereto. The push rod has a downwardly extended rearward end portion 67 engageable with the forward end of a shoulder block 68 mounted on the trip rod.

The structure described to this point is well known and its operational sequence briefly reviewed at this point as a convenience in describing the combination therewith of the holding apparatus of the present invention.

At the start of a baling operation, it is assumed that a previously formed bale 25 is positioned at the discharge end 15 of the bale chamber 10 and that the wires are tensioned across the admitting end 14 of the bale chamber as shown at 23 and have extended ends held in the wire retainers 41. With the needles 27 and tying mechanism 22 stopped in the position shown in Fig. 1, the plunger 16 is reciprocated to compress successive charges of hay into the bale chamber against the bale 25 drawing the wires rearwardly into the positions shown at 24. As the hay is compressed, the wires reach their positions shown at 70 by passing through the slots in the guards 40, over the twisters 38 and rearwardly in the chamber. During a hay compressing cycle normally including 12 or so reciprocal movements of the plunger, the push rod 66 is moved progressively rearwardly of the chamber.

The teeth 61 of the metering wheel 60 ride in the hay compressed in the chamber and rotate the wheel in a clockwise direction, as viewed in Fig. 1, causing the pawl 62 to pass through an arc of approximately 80° before striking a detent 71 mounted on the trip rod 65. The cam forces the detent and thus the trip rod rearwardly until the rearward end portion 67 of the push rod drops inwardly of the forward end of the shoulder block 68. Rearward movement of the push rod carries the trip rod rearwardly until the compressing cycle is completed, at which time, the overdrive mechanism stops the plunger and starts the rotation of the driven shaft 51 and the tying mechanism 22.

Rotation of the shaft 51 through the crank arm 53 and drag link 55 pulls the needle yoke 30 into the position shown in Fig. 2 thrusting the needles 27 through slots 17 provided in the plunger 16 transversely of the chamber 10. On movement of the needles through the chamber, the rollers 29 engage the wires 21 and thread them through the chamber about the bale 26.

Concurrently with insertion of the needles 27 through the chamber 10, the gripper yoke 46 is pivoted forwardly drawing the ends of the wires 21 from the wire retainers 41 into the twisters 38 which have moved outwardly into operable position. As conventionally operated, the needles in drawing the wires transversely of the forward end of the bale chamber frequently pull the wires about the newly formed bale 26 precluding placing of the ends of the wires in the twister. Subsequent operation results in such entanglement that it is called a "bird's nest" in the art. It is at this point that if continued operation is conducted without prompt corrective measures, the entangling of the wires and intricate tying mechanism subjects the baler to serious damage.

When the wire pick-up rollers 47 receive a loop of wire held by the rollers 29 of their respective needles 27 in the position shown in Fig. 2, it will be observed that the loop has an inner run and an outer run. As the needle yoke 30 and the gripper yoke 46 are returned to their initial positions, the inner runs of the wires are drawn into their respective twisters 38 and into the wire retainers 41. After the inner runs pass inwardly through the slots in the guards 40 past the wire separator plungers 42, the plungers are automatically extended upwardly between the inner and outer runs of the wire so that the outer runs cannot enter the twisters. As soon as the inner runs are located in the twisters and secured in the retainers, the twisters are operated following which the cutters 39 cut the inner runs in adjacent spaced relation to the retainers. Approximately concurrently with operation of the cutters, the separator plungers 42 are retracted. During operation of the tying mechanism, the push rod 66 starts its forward travel.

As the driven shaft 51 completes its rotation to return the needles to the positions shown in Fig. 1, a cam lever 75 radially extended from the driven shaft strikes a detent 76 on the trip rod 65 thrusting the trip rod rearwardly to activate the overdrive mechanism to start the plunger 16 and to interrupt motivation of the driven shaft 51 and the tying mechanism 22. As before, successive compacting of charges of hay into the chamber 10 by the plunger 16 draws the wires rearwardly into the positions shown at 70 with the wires passing over the twisters 38 and cutter 39. Successive operation is simply a repetition of that described.

The holding apparatus of the present invention obviates the entangling of tying wire in the described operation of the baler and is described in detail at this point. A sleeve 80 is mounted in a substantially erect position at the side of the bale chamber 10 inwardly adjacent to the wire retainers 41, as by plates 81, weldably secured thereto and bolted to a brace 82 conventionally employed in balers of the character described. The sleeve provides upwardly and downwardly disposed end portions having annular surfaces providing shoulders 83 in alignment longitudinally of the sleeve. The shoulders are preferably of ogee form oppositely endwardly extended from the sleeve in the same direction of travel circumferentially of the sleeve. A guide arm 84 is weldably secured to each end of the sleeve and is transversely extended therefrom with an edge aligned with the innermost portions of the adjacent annular surface. A slot 85 is provided in the sleeve intermediate its end portions in substantially right angular relation to the longitudinal axis of the sleeve.

An elongated rod 86 is rotatably mounted in the sleeve and upwardly and downwardly extended therefrom. The opposite ends of the sleeve are disposed in substantial alignment with the normal path of movement of the wires 21 when they are drawn into the positions shown at 70 and the endward extensions of the rod adjacent to the sleeve constitute guides about which the wires are tensioned in the compacting of a bale. A stud 87 is radially extended from the rod 86 through the slot 85 and serves to lock the rod 86 in fixed elevational position in the sleeve 80 while permitting rotation thereof within the limits of the slot. A cam 88 is mounted on the rod at each end of the sleeve, the pair of cams in alignment longitudinally thereof. As evident in Figs. 9, 10, and 11, each of the cams provide a clamping portion 89 of a configuration complementary to their adjacent shoulders 83 and thus of ogee form. Each of the cams also provides a radially disposed edge 90 also of ogee form and continuous with the clamping portions 89. The radially disposed edges advance circumferentially of the rod 86 in a common direction of travel from the clamping portions 89 and are of progressively increased radius as they advance from the sleeve. As will subsequently become more clearly apparent, the edges exercise a camming effect on the wires 21 tensioned thereagainst when the rod is rotated to cause the cams to approach their respectively adjacent shoulders 83. The camming effect thrusts the wires toward the sleeve so as to ride against the rod. The tension of the wires adds in this camming action and assures the drawing of the wires between the clamping portions 89 of the cams and the shoulders 83 prior to completion of rod rotation. Continued rotation in the direction described, counter-clockwise as viewed in Figs. 1, 2, 6, 7, and 8, causes the wire firmly to be held between the clamping portions and shoulders, as evident in Fig. 11.

As a convenient means for oscillating the rod 86 in the sleeve 80 synchronously with baling operations, a bracket 94 is rigidly mounted in adjusted spaced position on the trip rod 65 forwardly adjacent to the mounting of the rod 86 and sleeve 80. The bracket consists of a pair of plates 95 mounted in sandwich relation on the trip rod and drawn tightly thereagainst by bolts 96. Vertically juxtapositioned, elongated slots 97 are formed through the plates in substantially right angular relation to the trip rod 65. An elongated race 98 is weldably or otherwise secured in the slots.

An arm 100 is transversely extended from the upper end of the rod 86. A pair of links 101 are pivotally connected to the arm 100 and are forwardly extended therefrom above and below the plates 95. A roller 102 is rotatably mounted between the forward end portions of the links within the race 98. The arm and link constitute a control linkage for oscillating the rod in response to longitudinal reciprocation of the trip rod 65.

Operation

At the initiation of a baling operation, the wires 21 are stretched across the forward end portion of the bale chamber 10 and have free ends held in the wire retainers 41. As hay is compressed into the bale chamber by means of the plunger 16, the wires are gradually thrust rearwardly in the bale chamber to the position generally indicated at 24 about the bale thus formed.

As the hay is compacted into the bale, the metering wheel 60 rides in the compacted hay and is permitted to make approximately an 80° rotation without effect on the trip rod 65. As the metering wheel continues to rotate, the metering wheel pawl 62 is brought into engagement with the detent 71 and continued rotation of the metering wheel draws the trip rod 65 rearwardly until the end of the push rod 66 rides off the shoulder block 68 and drops therebehind for subsequent motivation of the trip rod by the push rod.

The push rod 66 is caused to travel rearwardly in engagement with the well known overdrive mechanism, not shown, and thrusts the trip rod 65 rearwardly. The conventional function of the trip rod is to operate the over-center mechanism which serves to interrupt reciprocation of the plunger 16 and to engage a clutch mechanism, also not shown, providing motivation for the gripper yoke 46, twister positioning mechanism, needle yoke driven shaft 51, and wire cutters 39. Near the end of the operation of the driving mechanism, as the needles 27 return to the positions shown in Fig. 1, a cam lever 75 radially extended from the needle yoke driven shaft 51 engages a cam follower or detent 76 mounted on the trip rod 65 and thrusts the trip rod forwardly to operate the over-center mechanism so as to disengage the clutch, and to reestablish driven connection to the plunger.

When a bale has been completed of predetermined length as indicated by the metering wheel 60, the metering wheel pawl 62, the detent 71, and the trip rod 65 operates in the manner described to interrupt the plunger operation and to engage a clutch to energize the wire-tying mechanism 22. Rotation of the needle yoke driven shaft 51 pivots the needle yoke 30 by means of the crank arm 53, lever arm 54, and drag link 55, to thrust the needles 27 through the channels 17 provided in the plunger 16, through the bale chamber 10, and into the position shown in Fig. 2. Concurrently, the gripper yoke 46 is pivoted forwardly to the position shown in Fig. 2. As the gripper yoke 46 moves forwardly, the twisters 38 move into extended position, and the wire pick-ups 47 carry the ends of the wires from the wire retainers 41 into the twister. The intended operation is for the ends of the wires 21 to pass from the wire pick-ups shortly before their movement into the position shown in Fig. 2 in which they engage loops of wire from the needles 27 for return to the positions shown in Fig. 1.

As previously indicated, it frequently happens in conventional balers that forward pivotal movement of the gripper yoke 46 pulls the wires 21 from the retainers 41 permitting the needles to pull the wires about the bale being tied. As is clearly evident in the operational sequence of Figs. 6, 7, and 8, when the trip rod 65 moves rearwardly in the baler, the roller 102 travels outwardly in the race 98 in response to travel of the bracket 94 unitarily with the trip rod 65 rearwardly in the baler and thus toward the wire holding apparatus of the present invention. Continued travel of the trip rod and bracket brings the roller into engagement with the outer end of the race 98 buckling the articulated linkage, 100—101 inwardly, as shown in Fig. 7. Still further rearward travel of the bracket relative to the wire holding apparatus causes the link 101 to pivot counter-clockwise about the roller, as viewed in Fig. 8, and rotates the inner arm 100 of the linkage and the rod 86 in a clockwise direction, as viewed.

It will be recalled that as hay is compressed in the bale chamber 10 the wires 21 are caused to travel rearwardly in the chamber to conform to the rearward end of the bale as at 24. As the wires travel rearwardly, they strike the radially disposed edges 90 of the cams 88 and as the wires are tensioned they slide longitudinally of the rod 86 toward the sleeve 80 and are tensioned about the periphery of the rod in proximity to the adjacent ends of the sleeve. As the rod 86 is rotated in a clockwise direction, as viewed in Figs. 6 to 8, the clamping portions 89 of the helical cams 88 engage the wires, shove the wires toward the helical shoulders 83 of the adjacent ends of the sleeve and when the bracket and the trip rod reach the rearward limit of their travel, as shown in Fig. 8, clamp the wires between the cams and the shoulders 83 of the adjacent ends of the sleeve, thus dependably securing the wire. With the wire so held, forward pivotal movement of the gripper yoke 46 causes the ends of the wires to be drawn from the wire retainers 41, into the twisters 38, and from the wire pick-up 47, obviating the described entangling of the wire experienced in conventional wire-tying balers.

As the gripper yoke 46 pivots rearwardly, it draws the innermost wires of the looped wires received from the needles 27 into the twisters 38 and the outermost wires are precluded from movement into the twisters by the synchronous operation of wire separator plungers 42 which extend upwardly between the inner and outer wires and hold the outer wires outwardly. The twisters 38 are automatically actuated to entwine the inner wire and the end of the wire to form loops constricted about the bale 24. Following the twisting operation, the shear plungers or cutters 39 are actuated to cut the wires 21 between the twisters and the wire retainers 41. At about this moment, the cam lever on the needle yoke driven shaft 51 engages detent 76 on the trip rod 65, thrusts the trip rod forwardly, and operates the over-center mechanism to reestablish driven connection to the plunger 16 and to disengage the clutch through which motivation of the tying mechanism 22 has been achieved.

It will be recalled that continued rotation of the needle yoke driven shaft 51 to complete the withdrawal of the needles from the bale chamber 10, results in the rearward thrusting of the trip rod 65 to actuate the over-center mechanism. This termination of the tying operation results in a counter-clockwise rotation of the rod 87 incident to forward movement of the bracket 94 visualized by reference to Figs. 6, 7, and 8, in their inverse order, releasing the wires, as shown in Fig. 9, for discharge of a tied bale of hay from the bale chamber in the conventional manner.

Although the wire holder of the present invention has upper and lower holding facilities to accommodate a pair of wires, it will be clearly apparent that the invention is not limited to use in the particular baler described which constitutes an operational environment with which the holder possesses particular utility. It is contemplated that the holder of the present invention may be adapted for use in many other operational environments where it is desired periodically to clamp and to release flexible tension members which can be drawn against the helical cam 88 or any desired number of cams for grasping between the clamping portion 89 or portions and any corresponding number of shoulders 83. Obviously, a plurality of sleeves 80 may be utilized, if desired.

The device of the present invention has proved successful in obviating the described slipping of wire about bales preliminary to their tying. It is simple to construct, easy to install on conventional balers as well as to incorporate in new baling structures, economical, durable, effects large savings in repair and adjustment time, and obviates the conventional waste of wire and hay.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a wire-tying baler having a bale chamber, means for compressing hay into the chamber, a source of tying wire mounted adjacent to the chamber, means for wrapping wire from the source thereof about a bale formed in the chamber, a wire cutter for severing wire wrapped about the bale from the source of wire, which hay compressing means, wire wrapping means, and wire cutter are successively operated; an elongated sleeve mounted adjacent to the path of travel of wire wrapped about bales formed in the chamber having an endwardly disposed annular surface providing a shoulder, a rod rotatably mounted in the sleeve, a cam mounted on the rod adjacent to the annular end surface of the sleeve having a portion complementary to the shoulder, means for guiding wire wrapped about bales formed in the chamber into peripheral engagement with the rod between the cam thereof and the shoulder of the sleeve, and a control linkage synchronously actuated with the wire wrapping means and wire cutter connected to the rod rotating the rod to move the cam toward the shoulder to clamp the wire between the cam and the shoulder as the wire is wrapped about bales formed in the chamber, and to rotate the rod in the opposite direction to release the wire subsequent to the completion of wrapping of wire about the bales formed in the chamber and the cutting of the wire from its source.

2. In a wire-tying baler the combination of a bale chamber, means for compressing hay in the chamber into bale form; a wire reel mounted at a side of the chamber; a needle mechanism for threading wire from the reel about hay compressed in the chamber to the opposite side of the chamber; a wire twister mounted at the opposite side of the chamber from the reel for tying wire passed about the compressed hay in the chamber; and means for severing the wire between the wire twister and the reel, the compressing means, the needle mechanism, the wire twister and the severing means being sequentially operated; a sleeve mounted in a substantially erect position adjacent to the wire severing means, a rod rotatably mounted in predetermined longitudinal position in the sleeve and having an end extended from an end of the sleeve engaged with the wire intermediate the severing means and the needle mechanism; a helical cam rigidly mounted on the rod adjacent to an end of the sleeve, the adjacent end of the sleeve having an endwardly disposed surface of generally ogee form axially advanced in the same direction of axial advancement of the cam on the rod; and a control linkage synchronously actuated with the needle mechanism, the wire twister and the severing means for rotating the rod to cause the cam to approach the adjacent end of the sleeve as the compressing means completes the formation of a bale prior to actuation of the wire twister and rotating the rod to cause the cam to retreat from the adjacent end of the sleeve intermediate successive actuation of the severing means and the compressing means.

3. The combination in a wire-tying baler having a bale chamber, means for compressing hay into the chamber, a pair of wire reels mounted at a side of the chamber, a pair of spaced needle mechanisms for threading wire from the reels about hay compressed in the chamber, a pair of wire twisters mounted at the opposite side of the chamber from the reels for tying pairs of wires passed about hay compressed in the chamber by the needle mechanisms, and means for severing the wire between the wire twisters and the reels adjacent to the twisters, which compressing means, needle mechanisms, wire twisters and the severing means are sequentially operated; of an elongated sleeve having oppositely disposed annular ends each providing a shoulder endwardly disposed from the sleeve mounted adjacent to the severing means at the side of the bale chamber opposite to the reels; a rod rotatably mounted in the sleeve; a cam integral with the rod adjacent to each end of the sleeve, the cams being provided in correspondingly spaced relation to the shoulders on their respectively adjacent ends of the sleeve in a common peripheral direction about the rod and each having a portion complementary to its respective shoulder, the sleeve and rod being mounted with respect to the severing means so that the pair of wires passed about the bales formed in the chamber are drawn individually against the cams adjacent to the cams' respective shoulders, and a control linkage synchronously actuated with the compressing means of the baler, the needle mechanisms, the wire twisters and the severing means rotating the rod to move the cams toward their respective shoulders in advance of actuation of the compressing means to clamp the pair of wires adjacent to the severing means between the cams and their respective shoulders, and rotating the rod in an opposite direction intermediate actuation of the severing means and successive actuation of the compressing means.

4. In a wire-tying baler having a bale chamber, means for compressing hay in the chamber into bales; a pair of wire supply reels mounted adjacent to the chamber at a side thereof; a pair of wire twisters mounted adjacent to the chamber at the side thereof opposite to the supply reels; a needle mechanism for delivering wires from the reels around bales formed in the chamber to the wire twisters; means adjacent to the wire twisters for severing portions of wire passed around a bale and twisted from wire on the reels, which compressing means, needle mechanism, wire mechanism, wire twisters, and wire severing means are sequentially operated; a wire holding mechanism comprising an elongated sleeve rigidly mounted in a substantially erect position adjacent to the chamber at the side thereof on which the twisters are mounted; an elongated rod rotatably mounted in the sleeve and upwardly and downwardly extended therefrom in engagement with the wires at opposite ends of the sleeves intermediate the wire severing means and the reels; wire engaging cams rigidly mounted on the rod at opposite ends of the sleeve, and control means synchronously actuated with the compressing means of the baler, the needle mechanism, the wire twisters, and the wire severing means reciprocally positioning the rod in the sleeve to a predetermined wire holding position as the compressing means completes the formation of a bale and prior to actuation of the wire twisters and to a predetermined releasing position intermediate operation of the severing means and compression means, the ends of the sleeve and the wire cams being cooperatively formed to clamp wires therebetween when the rod is in holding position and to release the wires for slidable travel about the rod when the rod is in releasing position.

5. In a wire-tying baler, having a baling chamber, a reciprocating plunger operated in the chamber, means for projecting a loop of wire across the chamber from a side thereof, a wire-tying apparatus on the opposite side of the chamber, a reciprocating wire pick-up moved in one direction to feed a free end of said wire into the wire-tying apparatus and movable in the opposite direction to lay a strand of the wire passed about a bale in the tying apparatus, and means for cutting the loop of wire subsequent to the tying operation; the combination of a pair of wire clamping members, means mounting the clamping members on opposite sides of the wire adjacent to the free end thereof for adjustment between predetermined wire clamping and wire releasing positions, and control means operatively associated with the clamping members synchronously actuated with the wire pick-up to cause the clamping members to clamp the wire during movement of the pick-up to feed the free end of the wire into the wire-tying apparatus and to release the wire for travel of the wire therepast intermediate actuation of the cutting means and successive movement of the pick-up to lay the new free end in the wire-tying apparatus.

6. In a baler having a bale chamber, means for compacting bulk material into bales in the chamber, a tying apparatus adjacent to the chamber, means for positioning a bale confining strand about bales compacted in the chamber, and a pick-up actuated to place the bale confining strand in the tying apparatus following its positioning about a bale in the chamber; the combination of strand grasping means engageable with the confining strand positioned about bales in the chamber, said grasping means comprising a fixed clamping member, and a cooperative clamping member movable toward and from the fixed clamping member between predetermined wire clamping and wire releasing positions; and a control linkage connected to said cooperative clamping member of the strand grasping means synchronously actuated with the pick-up to cause said cooperative clamping member to assume the wire clamping position during actuation of the pick-up to place the bale confining strand in the tying apparatus and to assume the releasing position intermediate successive actuations of the pick-up to place the confining strand in the tying apparatus.

7. In a baler having a bale chamber, means for compacting bulk material into bales in the chamber, a tying apparatus adjacent to the chamber, means for positioning a bale confining strand about bales compacted in the chamber, and a pick-up actuated to place the bale confining strand in the tying apparatus following its positioning about a bale in the chamber; the combination of a pair of wire clamping members providing complementary wire engaging surfaces, means mounting the clamping members in a position engageable with the confining strand positioned about bales in the chamber for relative movement between a first predetermined relation with the wire engaging surfaces clamping the wire therebetween and a second predetermined relation with the surfaces retracted from each other, and a control linkage operatively associated with the clamping members synchronously actuated with the pick-up to cause the members to assume said first predetermined relation during actuation of the pick-up to place the bale confining strand in the tying apparatus and to assume said second predetermined relation intermediate successive actuations of the pick-up to place the confining strand in the tying apparatus.

8. Mechanism for wire tying bales comprising a wire twister, means for holding the free end of a tie wire extended about a bale, needle means for projecting into the proximity of the free end of the wire that portion of the wire which is to be tied thereto to complete the tie, a wire laying device juxtaposed to said twister for laying said portion of the wire in the twister to be joined to the free end, a second holding means for the free end of the wire which engages the wire between the first named holding means and the bale loop during the laying of the free end and the wire twisting of the lays, and means releasing the end from the first named holding means when the second means becomes operative.

9. Mechanism according to claim 8 in which the first named holding means is connected with the wire laying device and the second named holding means is independent of the wire laying device.

10. Mechanism for wire tying bales comprising a wire twister gear, a wire laying device juxtaposed to said twister gear and movable relative thereto for laying in the twister gear the free end of a wire extended about a bale for joining to the opposite end of said wire, a free end holding device independent of said wire laying device and operative to maintain tension upon the wire about the bale during movement of said wire laying device, said holding member including a stationary member and a cooperative movable member, a movable needle which presents the opposite end of said wire on the twister side of the bale, and means timing the movement of the needle which also times the operation of said free end holding device.

References Cited in the file of this patent

UNITED STATES PATENTS

| | | |
|---|---|---|
| 367,245 | Shoemaker | July 26, 1867 |
| 468,717 | Wintrode | Feb. 9, 1892 |
| 1,624,157 | Carroll | Apr. 12, 1927 |
| 2,355,644 | Haase | Aug. 15, 1944 |
| 2,355,647 | Haase | Aug. 15, 1944 |
| 2,405,688 | Crumb | Aug. 13, 1946 |

FOREIGN PATENTS

| | | |
|---|---|---|
| 112,771 | Australia | Mar. 19, 1941 |
| 271,753 | Germany | Mar. 19, 1914 |